United States Patent
Ji et al.

(10) Patent No.: US 11,442,564 B2
(45) Date of Patent: Sep. 13, 2022

(54) TOUCH DISPLAY DEVICE AND PREPARATION METHOD THEREOF, AND TERMINAL EQUIPMENT

(71) Applicants: Chengdu BOE Optoelectronics Technology Co., Ltd., Chengdu (CN); BOE Technology Group Co., Ltd., Beijing (CN)

(72) Inventors: Bing Ji, Beijing (CN); Xiaoxia Huang, Beijing (CN)

(73) Assignees: CHENGDU BOE OPTOELECTRONICS TECHNOLOGY CO., LTD., Sichuan (CN); BOE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/040,864

(22) PCT Filed: Mar. 26, 2020

(86) PCT No.: PCT/CN2020/081517
§ 371 (c)(1),
(2) Date: Sep. 23, 2020

(87) PCT Pub. No.: WO2020/215983
PCT Pub. Date: Oct. 29, 2020

(65) Prior Publication Data
US 2021/0019001 A1  Jan. 21, 2021

(30) Foreign Application Priority Data
Apr. 25, 2019  (CN) .......................... 201910338251.3

(51) Int. Cl.
*G06F 3/041* (2006.01)

(52) U.S. Cl.
CPC .... *G06F 3/041* (2013.01); *G06F 2203/04102* (2013.01); *G06F 2203/04103* (2013.01)

(58) Field of Classification Search
CPC . G06F 2203/04102; G06F 2203/04103; G06F 3/041
See application file for complete search history.

(56) References Cited

U.S. PATENT DOCUMENTS

| 8,693,202 B2 | 4/2014 | Yoshifusa |
| 2016/0011687 A1 | 1/2016 | Ding et al. |

(Continued)

FOREIGN PATENT DOCUMENTS

| CN | 103472963 A | 12/2013 |
| CN | 204928922 U | 12/2015 |

(Continued)

OTHER PUBLICATIONS

CN201910338251.3 OA1.

*Primary Examiner* — Temesghen Ghebretinsae
*Assistant Examiner* — Sosina Abebe
(74) *Attorney, Agent, or Firm* — IPro, PLLC

(57) ABSTRACT

The present disclosure relates to the technical field of display devices, and discloses a touch display device and a fabrication method thereof, and terminal equipment. The touch display device includes: a cover plate; a mold frame, including a bottom and an extended part, wherein the bottom and the extended part define a groove; adhesive, located at the end part of the extended part; a touch display module, located in the groove and including a display panel and a touch panel located at the side, facing the cover plate, of the display panel; and a touch flexible printed circuit board, bound to a side edge of the side, facing away from the display panel, of the touch panel and bent to the side, facing away from the touch panel, of the display panel, wherein the touch flexible printed circuit board is provided with a (Continued)

plurality of through holes at the area other than the binding position. The touch display device has the advantage that the size of the border is effectively reduced, thereby providing a feasible technical solution for fabricating full-screen terminals.

15 Claims, 6 Drawing Sheets

(56) References Cited

U.S. PATENT DOCUMENTS

| | | | |
|---|---|---|---|
| 2016/0270234 A1* | 9/2016 | Ahn | G06F 3/047 |
| 2018/0199447 A1* | 7/2018 | Lin | H05K 13/0465 |
| 2018/0199457 A1* | 7/2018 | Cheng | G06F 1/1637 |
| 2019/0139905 A1 | 5/2019 | Cheng et al. | |
| 2019/0384435 A1 | 12/2019 | Tsai et al. | |
| 2020/0212369 A1 | 7/2020 | Ji et al. | |
| 2021/0019001 A1 | 1/2021 | Ji et al. | |

FOREIGN PATENT DOCUMENTS

| | | | |
|---|---|---|---|
| CN | 106960198 A | | 7/2017 |
| CN | 107436705 A | | 12/2017 |
| CN | 107864552 A | | 3/2018 |
| CN | 108803164 A | | 11/2018 |
| CN | 108829286 A | | 11/2018 |
| CN | 109101140 A | * | 12/2018 |
| CN | 109101140 A | | 12/2018 |
| CN | 109343249 A | | 2/2019 |
| CN | 208538106 U | | 2/2019 |
| CN | 109445007 A | | 3/2019 |
| CN | 109542270 A | | 3/2019 |
| CN | 110096176 A | | 8/2019 |
| JP | 2014002540 A | | 1/2014 |

* cited by examiner

TOUCH DISPLAY DEVICE AND PREPARATION METHOD THEREOF, AND TERMINAL EQUIPMENT

This application is a US National Stage of International Application No. PCT/CN2020/081517, filed Mar. 26, 2020, which claims priority to Chinese Patent Application No. 201910338251.3, filed with the Chinese Patent Office on Apr. 25, 2019 and entitled "TOUCH DISPLAY DEVICE AND PREPARATION METHOD THEREOF, AND TERMINAL EQUIPMENT", which is incorporated herein by reference in its entirety.

FIELD

The present disclosure relates to the field of display equipment, and in particular to a touch display device and a preparation method thereof, and terminal equipment.

BACKGROUND

At present, AMOLED display devices, as display parts of electronic equipment, have been widely used in various electronic products. AMOLED display modules are important parts of display devices. Full screens have become the trend of display devices in recent years. In the application of full screen technologies, a limiting factor is bottom borders.

SUMMARY

The present disclosure provides the following technical solutions.

A touch display device includes: a cover plate; a mold frame, including a bottom and an extended part, where the extended part is connected with an edge of the bottom and extends to one side of the cover plate, and the bottom and the extended part define a groove; adhesive, located at the end part of the extended part; a touch display module, located in the groove and including a display panel and a touch panel located at a side, facing the cover plate, of the display panel; and a touch flexible printed circuit board, bound to a side edge of a face, facing away from the display panel, of the touch panel and bent to a side, facing away from the touch panel, of the display panel, wherein the touch flexible printed circuit board includes a plurality of through holes at an area other than a binding position and is configured to allow the adhesive to overflow to an area outside the extended part through the through holes when the cover plate and the mold frame are to be bonded together, so that the mold frame and the cover plate are bonded together by the adhesive at the extended part and the area outside the extended part.

In a possible implementation, the touch flexible printed circuit board includes: first binding parts, bound to the side, facing away from the display panel, of the touch panel; second binding parts, bent to the side, facing away from the touch panel, of the display panel; and bent parts configured to connect the first binding parts with the second binding parts.

In a possible implementation, the through holes are formed in the bent parts.

In a possible implementation, the through holes include a plurality of first through holes formed in each first binding part and a plurality of second through holes formed in each second binding part.

In a possible implementation, the first through holes are symmetric to the second through holes.

In a possible implementation, the adhesive further covers an inner side wall of the side, facing the touch display module, of the extended part.

In a possible implementation, the adhesive further covers a part of the bottom.

In a possible implementation, the orthographic projection of the adhesive on the bottom is overlapped with the touch flexible printed circuit board.

In a possible implementation, the display panel includes: a first display part, opposite to the touch panel; a second display part, bent to the back of the display panel; and a third display part, configured to connect the first display part with the second display part, where the second binding parts are located on the side, facing the bottom, of the second display part.

In a possible implementation, the touch display device further includes a coating covering the third display part, and a gap is formed between the adhesive and the coating.

In a possible implementation, the touch display module further includes: a first back film, located on the side, facing away from the touch panel, of the first display part, and a second back film, located on the side, facing the touch panel, of the second display part; a heat radiating film, located on the side, facing away from the first display part, of the first back film; and first glue, located between the heat radiating film and the second back film.

In a possible implementation, the touch display module further includes a chip on film, where the chip on film includes a first flip-chip part, a second flip-chip part, and a third flip-chip part configured to connect the first flip-chip part with the second flip-chip part.

In a possible implementation, the first flip-chip part is located between the second binding parts and the second display part, and the second flip-chip part is attached to the side, facing the bottom, of the heat radiating film.

In a possible implementation, the touch display module further includes: a polarizer, located on the side, facing away from the display panel, of the touch panel; second glue, located between the polarizer and the touch panel; and third glue, located between the polarizer and the cover plate.

An embodiment of the present disclosure further provides terminal equipment, including the touch display device provided by the embodiments of the present disclosure.

An embodiment of the present disclosure further provides a method for preparing the touch display device provided by the embodiments of the present disclosure, including: providing a touch display module; binding a touch flexible printed circuit board to a side edge of the touch display module; placing the touch display module to which the touch flexible printed circuit board is bound in a groove of a mold frame; forming adhesive at the end part of an extended part of the mold frame; and bonding a cover plate and the mold frame oppositely, so that the adhesive cover plates the end part of the extended part, and overflows to the side, facing the touch display module, of the extended part through the through holes in the touch flexible printed circuit board, thereby sticking the cover plate to the mold frame.

In a possible implementation, the binding a touch flexible printed circuit board to a side edge of the touch display module includes: binding the flat touch flexible printed circuit board to the touch panel, where parts, in contact with the touch panel, of the touch flexible printed circuit board are used as first binding parts; forming second binding parts, facing away from the touch panel, of the display panel and bent parts configured to connect the first binding parts with the second binding parts by bending the area, protruding from the display panel, of the flat touch flexible printed circuit board inversely towards the side, facing away from the touch panel, of the display panel; and forming the plurality of through holes by punching the first binding parts and the second binding parts by punching equipment.

In a possible implementation, the binding a touch flexible printed circuit board to a side edge of the touch display module includes: binding the flat touch flexible printed circuit board to the touch panel, wherein the flat touch flexible printed circuit board includes preset bending areas, the preset bending areas protrude from the display panel, and a plurality of through holes are formed in each preset bending area; and forming bent parts by bending the preset bending areas inversely towards the side, facing away from the touch panel, of the display panel.

DETAILED DESCRIPTION OF THE EMBODIMENTS

The technical solutions in the embodiments of the present disclosure will be clearly and completely described in conjunction with the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the scope of the present disclosure.

Figure 1:
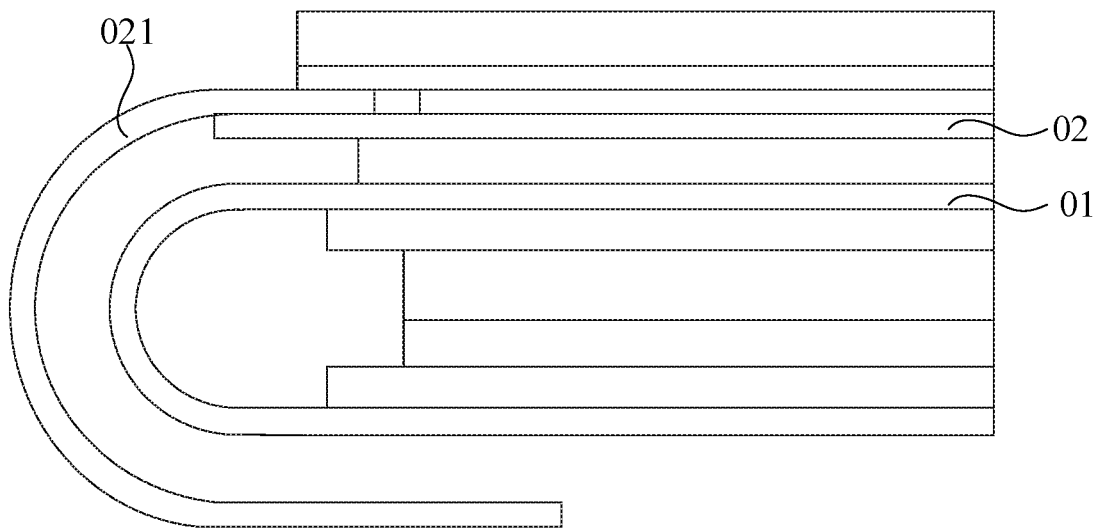
FIG. 1 is a stacked diagram of a touch display module in the related art.
Figure 2:
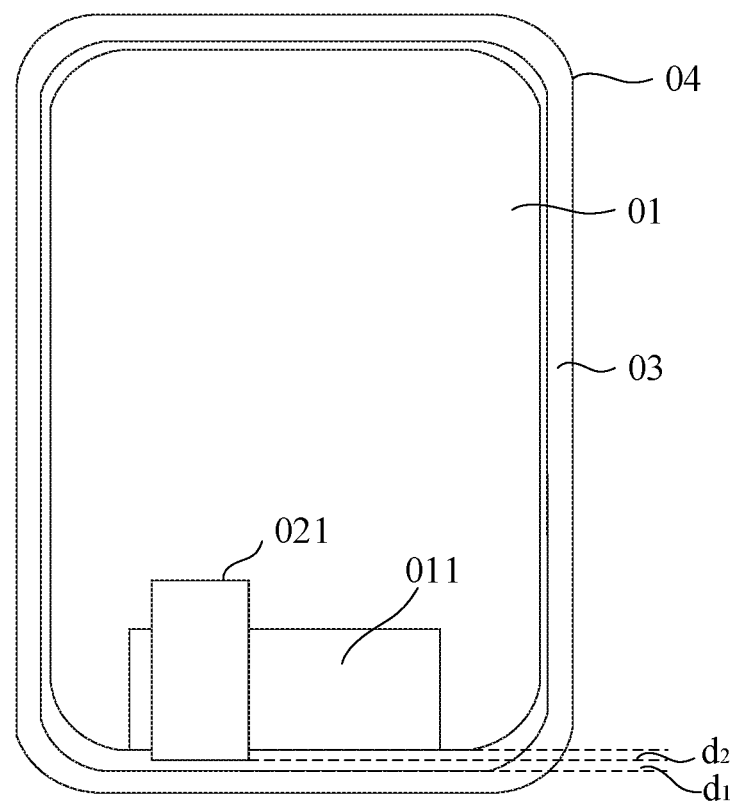
FIG. 2 is an assembled structural schematic diagram of a touch display device in the related art.

As shown in FIG. 1 and FIG. 2, a touch sensor 02 of an active-matrix organic light-emitting diode (AMOLED) display module mainly adopts the form of an external hanging touch panel. A flexible printed circuit board (T-FPC) 021 of the external hanging touch panel is separated from a flexible printed circuit board (M-FPC) 011 of a display panel 01. The T-FPC needs to individually protrude from a border of the AMOLED display module. Due to a certain tolerance existing in the fabrication process of a product, an inversely bent border of the T-FPC is generally greater than a border of the display panel in size. As a result, the border of the display module is enlarged. A popular design of full-screen terminals in the market is that the M-FPC and the T-FPC separately protrude from a bottom border of the display module. As the binding and inverse bending of the T-FPC take up space, the bottom border of the AMOLED display module is widened, making it impossible for the terminal to be really full-screen.

As shown in FIG. 2, the inversely bent border of the T-FPC 021 is greater than the border of the display panel by a distance. The distance is set as $d_2$. Bonding of the AMOLED display module with a mold frame is generally that an edge of the mold frame is subjected to dispensing to form a sealant 03 which then bonds with an edge 04 of a cover plate. The dispensing manner of the mold frame is dispensing a circle of adhesive at the periphery of the mold frame. Generally, in order to prevent the adhesive from shrinking and damaging the display panel 01, a safety distance needs to be reserved for avoiding the display panel during dispensing, where the safety distance is set as $d_1$. The principle for dispensing on the bottom border is directly avoiding the T-FPC 021 by the safety distance $d_1$, thereby preventing the T-FPC from pressing the display panel due to adhesive shrinkage. Therefore, the actual distance between the bottom border of the display module and the border of the display panel is $d_1+d_2$. It can be learned that when the mold frame bonds with the AMOLED display module with the external hanging touch panel, a bottom border of a mold frame of a terminal product needs to be enlarged to ensure a sufficient safety distance. As a result, the terminal cannot be really full-screen.

Figure 3A:
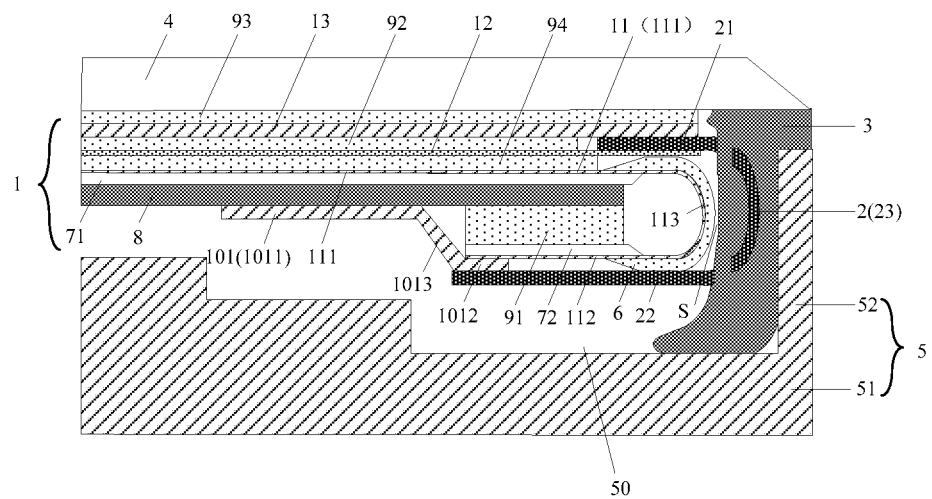
FIG. 3A is a sectional structural schematic diagram of a touch display device provided by an embodiment of the present disclosure.
Figure 3B:
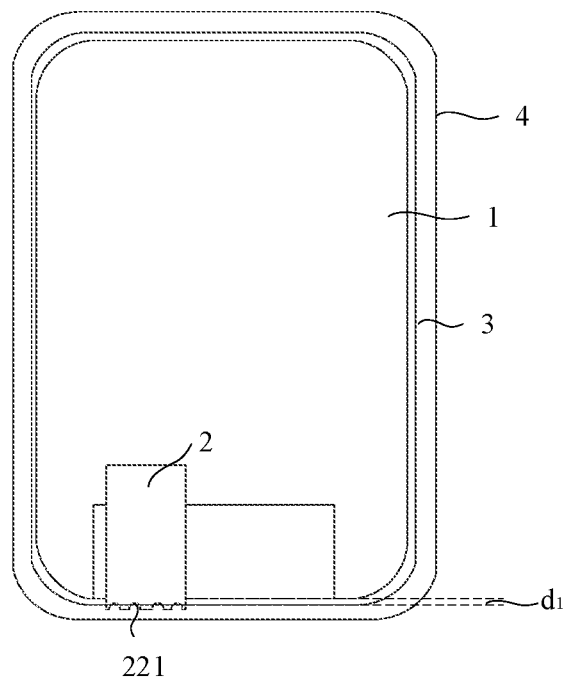
FIG. 3B is a top-viewed structural schematic diagram of a touch display device provided by an embodiment of the present disclosure.

As shown in FIG. 3A and FIG. 3B, the present disclosure provides a touch display device, including: a cover plate 4; a mold frame 5, including: a bottom 51, and an extended part 52 that is connected to an edge of the bottom 51 and extends to one side of the cover plate 4, where the bottom 51 and the extended part 52 define a groove 50; adhesive 3, located at the end part of the extended part 52; a touch display module 1, located in the groove 50 and including a display panel 11 and a touch panel 12 located at the side, facing the cover plate 4, of the display panel 11; and a touch flexible printed circuit board 2, bound to a side edge of the face, facing away from the display panel 11, of the touch panel 12 and bent to the side, facing away from the touch panel 12, of the display panel 11, where the touch flexible printed circuit board 2 is provided with a plurality of through holes 221 at the area other than the binding position and is configured to allow the adhesive 3 to overflow to an area outside the extended part 52 (such as the left side of the extended part 52 shown in FIG. 3A) through the through holes 221 when the cover plate 4 and the mold frame 5 are to be bonded together, so that the mold frame 5 and the cover plate 4 are bonded together by the adhesive 3 at the extended part 52 and the area outside the extended part 52.

In the touch display device provided in the foregoing embodiments of the present disclosure, as the through holes 221 are formed in the touch flexible printed circuit board 2, part of adhesive 3 on the mold frame can overflow to the inner surface of the cover plate 4 through the through holes 221 to bond with an edge of the cover plate 4. In addition, shrinking of the adhesive 3 has no impact on the display panel 11. Therefore, during setting of a safety distance between the adhesive 3 and the touch display module 1, avoiding of the touch flexible printed circuit board 2 does not need to be taken into consideration, instead, a border of the display panel 11 is directly avoided by the preset safety distance $d_1$, thereby effectively reducing the size of the border of the touch display device. This provides a feasible technical solution for fabricating full-screen terminal equipment.

It should be noted that, due to the arrangement of the through holes 221 in the touch flexible printed circuit board 2, the number of wirable areas (namely, areas between every two through holes) is reduced. Therefore, in order to guarantee the wiring size of the touch flexible printed circuit board 2, the actual width of the touch flexible printed circuit board 2 can be widened, and then holes are punched at intervals. Preferably, the touch flexible printed circuit board 2 is widened to two times its original width.

Figure 4:
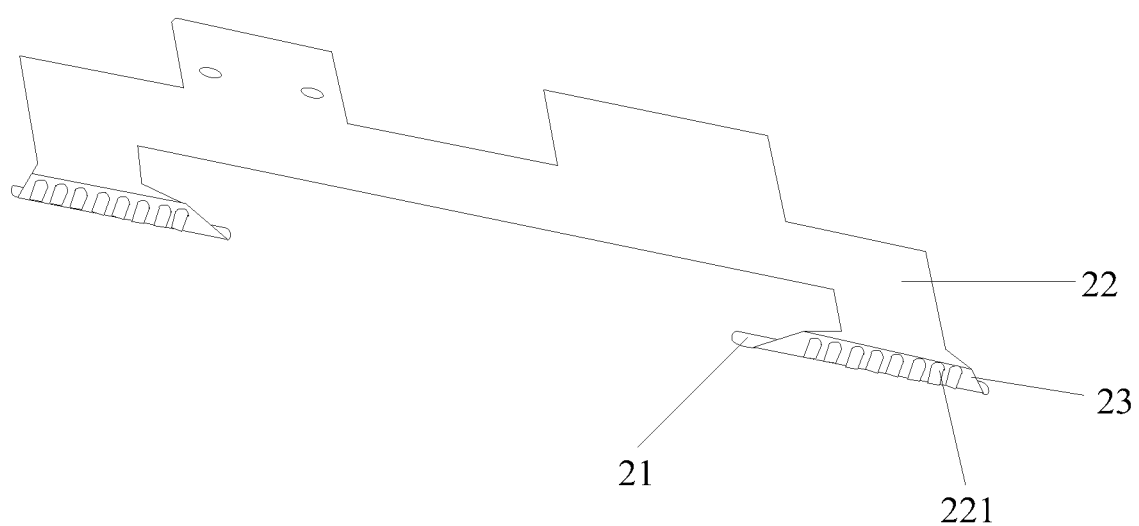
FIG. 4 is a structural schematic diagram of a touch flexible printed circuit board provided by an embodiment of the present disclosure.

Specifically, in the touch display device provided in the foregoing embodiment of the present disclosure, with reference to FIG. 3A and FIG. 4, the touch flexible printed circuit board 2 includes: first binding parts 21, bound to the side, facing away from the display panel 11, of the touch panel 12; second binding parts 22 bent to the side, facing away from the touch panel 12, of the display panel 11; and bent parts 23 configured to connect the first binding parts 21 with the second binding parts 22, where the through holes 221 are formed in the bent parts 23.

Figure 5:
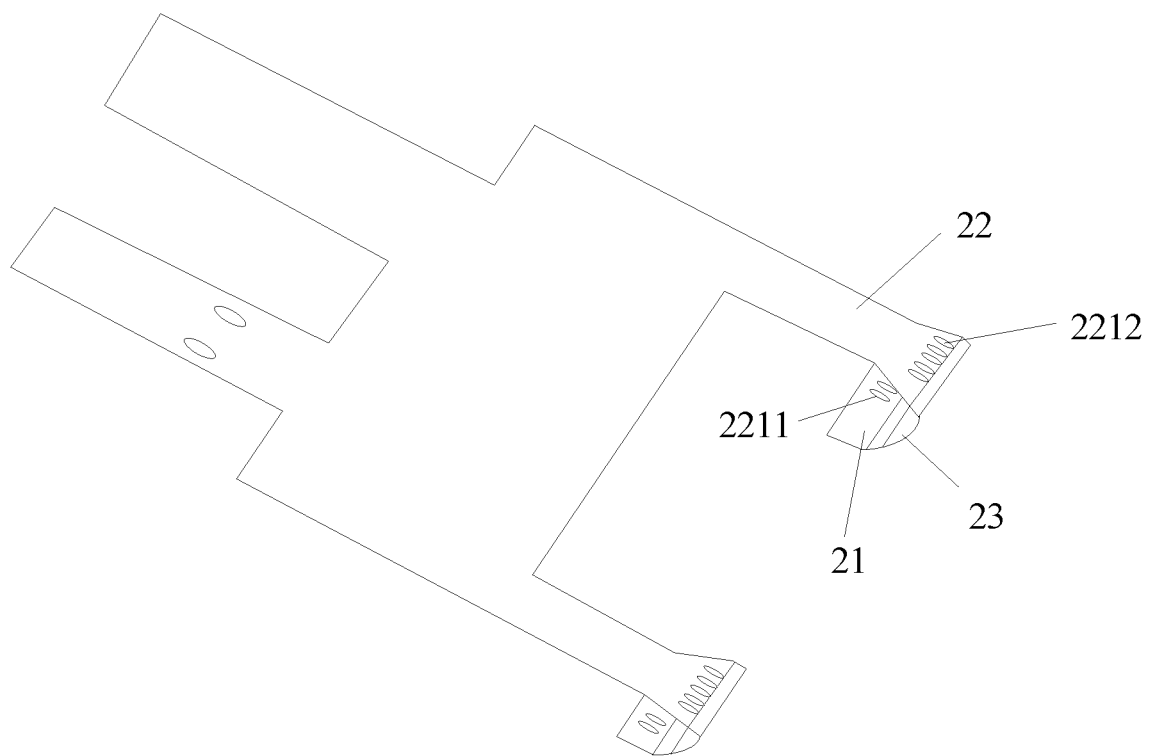
FIG. 5 is a structural schematic diagram of a touch flexible printed circuit board provided by an embodiment of the present disclosure.

Alternatively, as shown in FIG. 5, the through holes 221 may also be formed in the first binding parts 21 and the second binding parts 22, that is, the through holes 221 include a plurality of first through holes 2211 formed in each first binding part 21 and a plurality of second through holes 2212 formed in each second binding part 22.

Specifically, the first through holes 2211 are symmetric to the second through holes 2212, so that the adhesive 3 can flow through the touch flexible printed circuit board 2 well.

In some embodiments, the through holes 221 may also be formed in the first binding parts 21 but not in the second binding parts 22, or in the second binding parts 22 but not in the first binding parts 21.

In the touch display device provided in the foregoing embodiment of the present disclosure, as shown in FIG. 4, the through holes 221 may be formed in the bent parts 23. Alternatively, as shown in FIG. 5, the through holes 221 may also be formed in the first binding parts 21 and the second binding parts 22. The adhesive 3 needs to avoid only the touch display module 1 by the preset safety distance $d_1$, but does not need to avoid the touch flexible printed circuit board 2 by the safety distance $d_1$, so that the distance between the border, to which the touch flexible printed circuit board 2 is bound, of the touch display module and the border of the display panel 11 is changed from $d_1+d_2$ to $d_1$, thereby effectively narrowing the border, to which the touch flexible printed circuit board 2 is bound, of the touch display module.

Specifically, in the display device provided in the foregoing embodiments of the present disclosure, the preset safety distance $d_1$ may range from 0.3 mm to 0.5 mm, facilitating the realization of a full screen. It can be understood that the preset safety distance $d_1$ is a safety distance before bonding of the mold frame 5 and the cover plate 4.

Optionally, with reference to FIG. 3A, the adhesive 3 further covers an inner side wall of the side, facing the touch display module 1, of the extended part 52, and further covers part of the bottom 51. In the embodiments of the present disclosure, the adhesive 3 further covers the inner side wall of the side, facing the touch display module 1, of the extended part 52, and further covers part of the bottom 51, so that the touch display module 1 and the mold frame 5 can be fixed well.

Figure 3C:
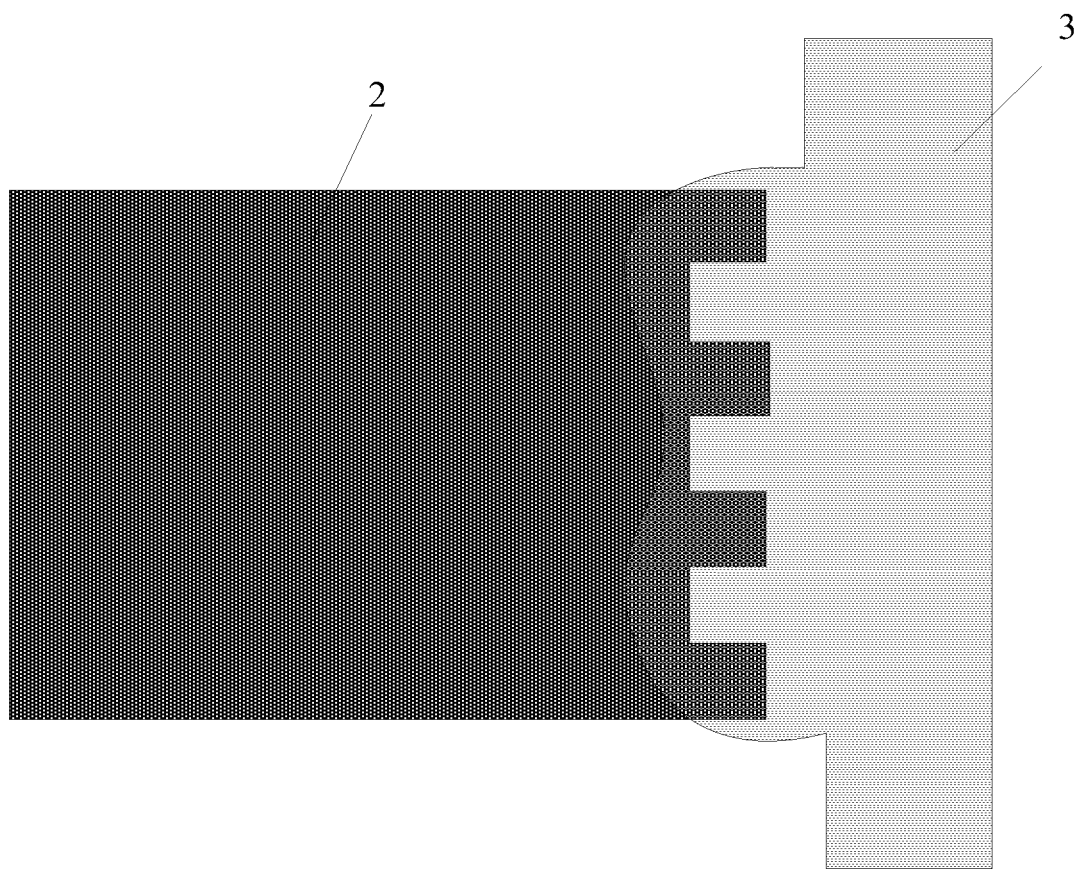
FIG. 3C is a projection schematic diagram of adhesive and a coating provided by an embodiment of the present disclosure.

Optionally, with reference to FIG. 3C, the orthographic projection of the adhesive 3 on the bottom 51 is overlapped with the touch flexible printed circuit board 2.

Optionally, with reference to FIG. 3A, the display panel 11 includes a first display part 111 opposite to the touch panel 12, a second display part 112 bent to the back of the display panel, and a third display part 113 configured for connecting the first display part 111 with the second display part 112, where the second binding parts 22 are located on the side, facing the bottom 51, of the second display part 112. With reference to FIG. 3A, the touch display device further includes a coating 6 covering the third display part 113, and a gap S exists between the adhesive 3 and the coating 6.

Optionally, with reference to FIG. 3a, the touch display module 1 further includes: a first back film 71 located on the side, facing away from the touch panel 12, of the first display part 111; a second back film 72 located on the side, facing the touch panel 11, of the second display part 112; a heat radiating film 8 located on the side, facing away from the first display part 111, of the first back film 71; and first glue 91 located between the heat radiating film 8 and the second back film 72.

Optionally, with reference to FIG. 3A, the touch display module 1 further includes: a chip on film 101, where the chip on film 101 includes a first flip-chip part 1101, a second flip-chip part 1012, and a third flip-chip part 1013 configured for connecting the first flip-chip part 1011 with the second flip-chip part 1012; the first flip-chip part 1011 is located between the second binding parts 22 and the second display part 112; and the second flip-chip part 1012 is attached to the face, facing the bottom 51, of the heat radiating film 8.

Optionally, with reference to FIG. 3A, the touch display module further includes: a polarizer 13 located on the side, facing away from the display panel 11, of the touch panel 12; second glue 92 located between the polarizer 13 and the touch panel 12; third glue 93 located between the polarizer 13 and the cover plate 4; and fourth glue 94 located between the display panel 11 and the touch panel 12.

An embodiment of the present disclosure further provides terminal equipment, including any of the touch display devices provided by the foregoing embodiments.

Figure 8:
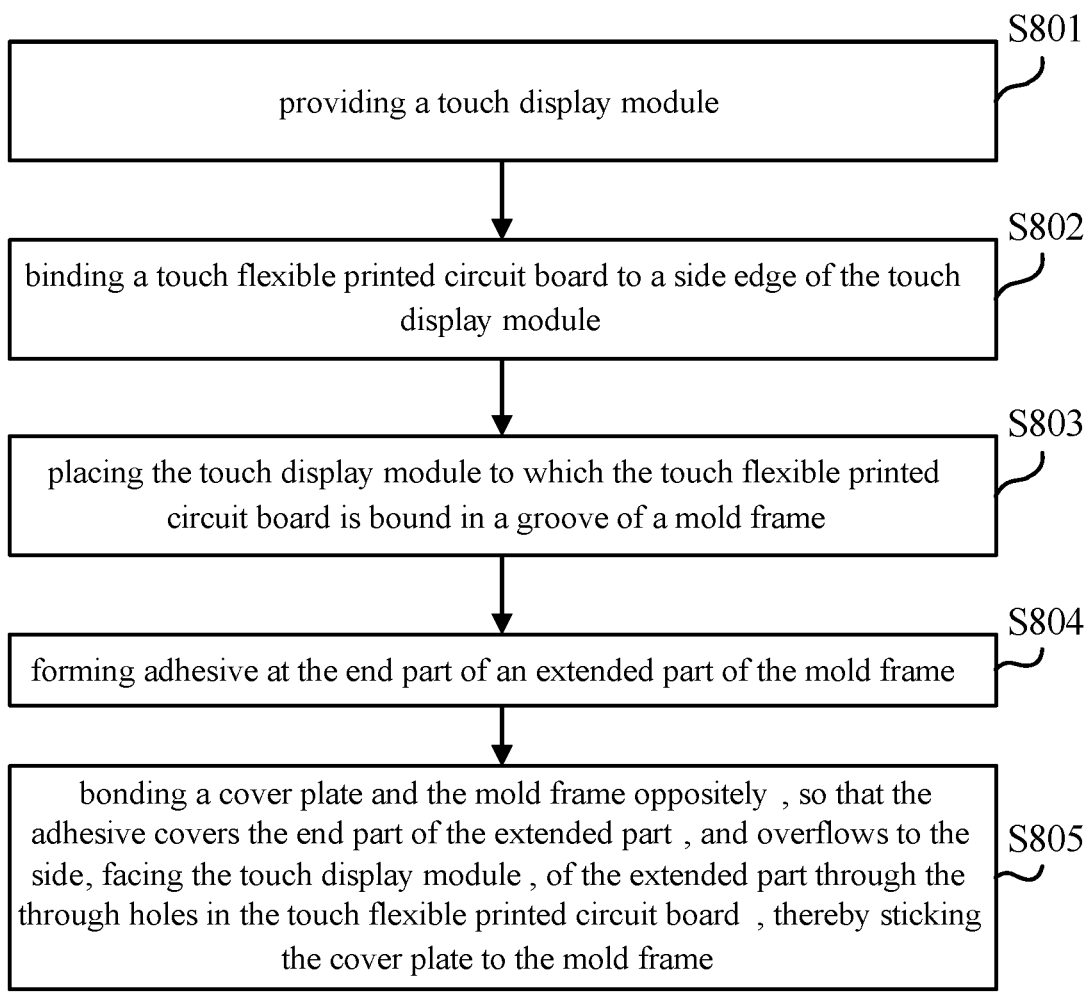
FIG. 8 is a flowchart of a method for preparing a touch display device provided by an embodiment of the present disclosure.

Based on the same disclosure idea, the present disclosure further provides a method for preparing a touch display device. As shown in FIG. 8, the method includes the following steps.

S801: providing a touch display module.

S802: binding a touch flexible printed circuit board to a side edge of the touch display module.

S803: placing the touch display module to which the touch flexible printed circuit board is bound in a groove of a mold frame.

S804: forming adhesive at the end part of an extended part of the mold frame.

S805: bonding a cover plate and the mold frame oppositely, so that the adhesive covers the end part of the extended part, and overflows to the side, facing the touch display module, of the extended part through the through holes in the touch flexible printed circuit board, thereby sticking the cover plate to the mold frame.

In the preparation method of the display device provided in the foregoing embodiments of the present disclosure, as the through holes are formed in the touch flexible printed circuit board, part of adhesive on the mold frame can overflow to the inner surface of the cover plate through the through holes to bond with an edge of the cover plate. In addition, shrinking of the adhesive has no impact on the display panel. Therefore, during setting of a safety distance between the adhesive and the touch display module, avoiding of the touch flexible printed circuit board does not need to be taken into consideration, instead, a border of the display panel is directly avoided by the preset safety distance, thereby effectively reducing the size of the border of the display device. This provides a feasible technical solution for fabricating full-screen terminal equipment.

Figure 9:
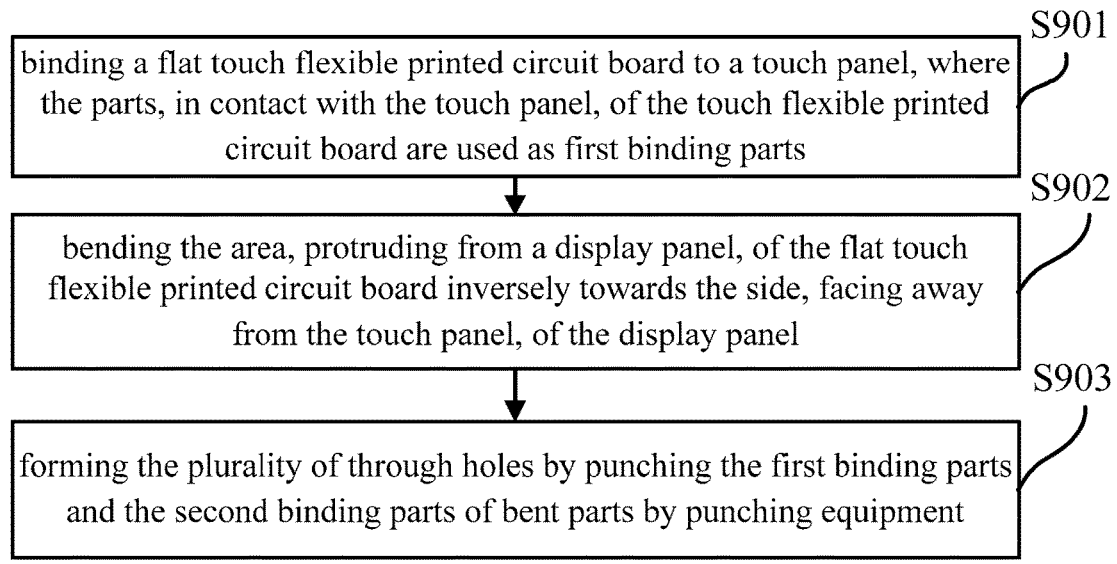
FIG. 9 is a flowchart of binding a touch flexible printed circuit board to a touch panel provided by an embodiment of the present disclosure.

Optionally, as shown in FIG. 9, the step S802 of binding a touch flexible printed circuit board to a side edge of the touch display module specifically includes the following steps.

S901: binding the flat touch flexible printed circuit board to a touch panel, where the parts, in contact with the touch panel, of the touch flexible printed circuit board are used as first binding parts.

S902: forming second binding parts, facing away from the touch panel, of the display panel and bent parts configured to connect the first binding parts with the second binding parts by bending the area, protruding from the display panel, of the flat touch flexible printed circuit board inversely towards the side, facing away from the touch panel, of the display panel.

S903: forming the plurality of through holes by punching the first binding parts and the second binding parts by punching equipment.

Specifically, small-diameter punching equipment can be used for punching.

Figure 7:
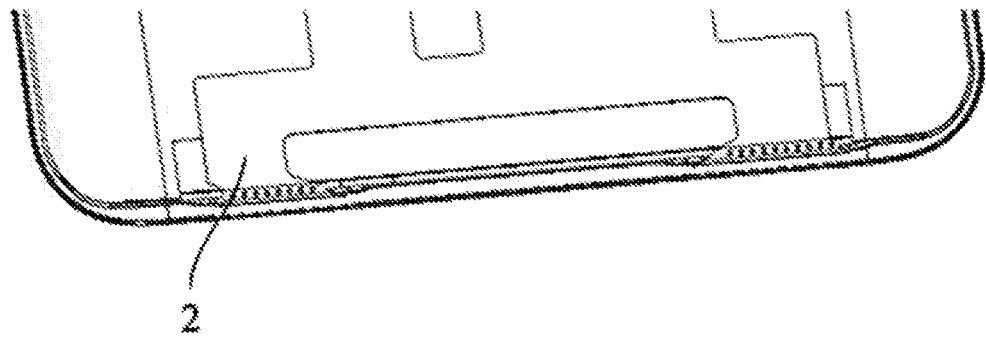
FIG. 7 is an installation state diagram of a touch flexible printed circuit board provided by an embodiment of the present disclosure.

As shown in FIG. 5, in the foregoing method, the first binding parts and the second binding parts on both sides of the bent parts are punched after the touch flexible printed circuit board is bent, so that the precision requirement on the punching equipment is relatively high. However, in this solution, calculating positions of the bent parts of the touch flexible printed circuit board in advance is not required, and all that is needed is to improve the punching position precision. FIG. 7 shows an installation state diagram of a flexible printed circuit board fabricated according to the foregoing method.

Figure 10:
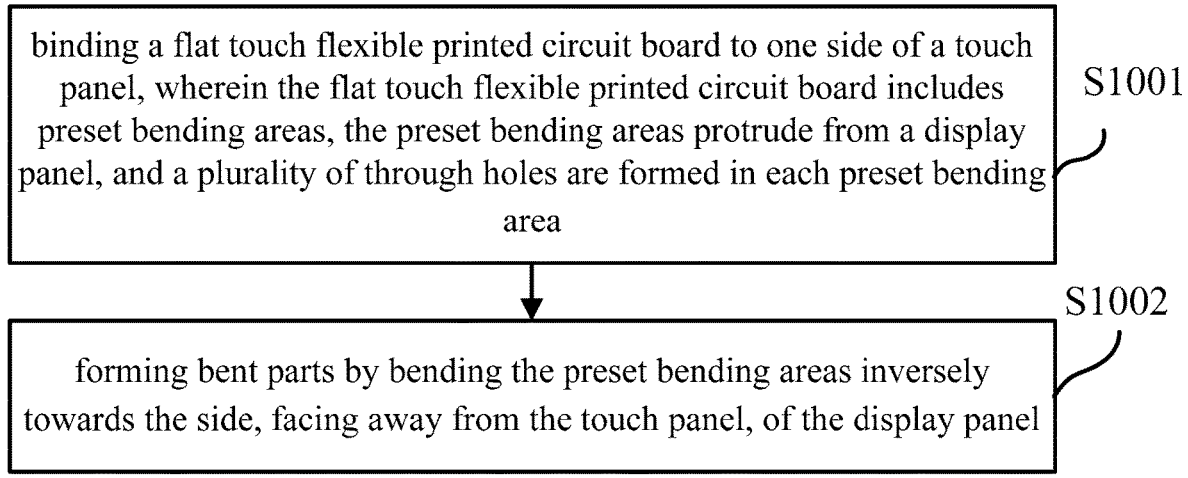
FIG. 10 is another flowchart of binding a touch flexible printed circuit board to a touch panel provided by an embodiment of the present disclosure.

Optionally, as shown in FIG. 10, the step S802 of binding a touch flexible printed circuit board to a side edge of the touch display module specifically includes the following steps.

S1001: binding a flat touch flexible printed circuit board to one side of a touch panel, wherein the flat touch flexible printed circuit board includes preset bending areas, wherein the preset bending areas protrude from the display panel, and a plurality of through holes are formed in each preset bending area.

S1002: forming bent parts by bending the preset bending areas inversely towards the side, facing away from the touch panel, of the display panel.

Figure 6:
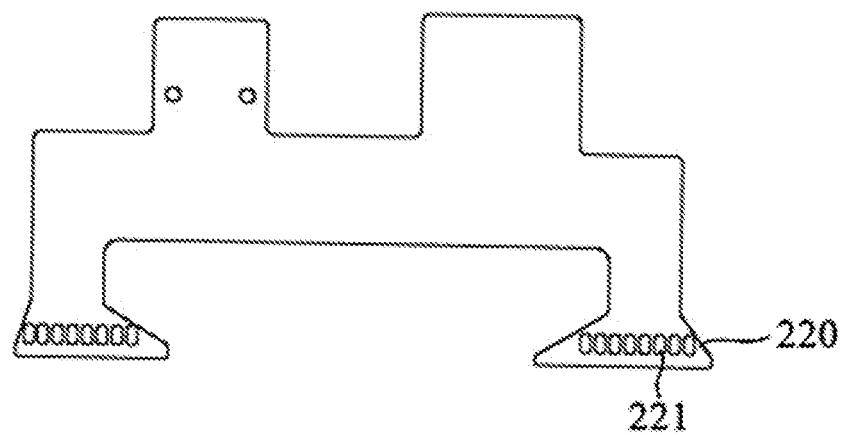
FIG. 6 is a structural schematic diagram of a flat touch flexible printed circuit board provided by an embodiment of the present disclosure.

In the foregoing method, when the touch flexible printed circuit board is supplied, a series of through holes have already been formed in each preset bending area 220 of the touch flexible printed circuit board, as shown in FIG. 6. Then, the preset bending areas are bent to form the bent parts of the touch flexible printed circuit board. The structure obtained after the bending is shown in FIG. 4. In this solution, punching is not required after the touch flexible printed circuit board is bent, no procedure needs to be added to the existing process, and the hole precision is high. But calculating of the positions of the bent parts of the touch flexible printed circuit board in advance is required.

Obviously, a person skilled in the art can make various modifications and variations to the embodiments of the present disclosure without departing from the spirit and scope of the present disclosure. The present disclosure is intended to cover these modifications and variations of the present disclosure provided that they fall within the scope of protection defined by the following claims and their equivalent technologies.

What is claimed is:

1. A touch display device, comprising:
   a cover plate;
   a mold frame, comprising a bottom and an extended part, wherein the extended part is connected with an edge of the bottom and extends to one side of the cover plate, and the bottom and the extended part define a groove;
   adhesive, located at an end part of the extended part;
   a touch display module, located in the groove, wherein the touch display module comprises a display panel and a touch panel, wherein the touch panel is located at a side, facing the cover plate, of the display panel; and
   a touch flexible printed circuit board, bound to a side edge of a face, facing away from the display panel, of the touch panel and bent to a side, facing away from the touch panel, of the display panel, wherein the touch flexible printed circuit board comprises a plurality of through holes at an area other than a binding position and is configured to allow the adhesive to overflow to an area outside the extended part through the through holes when the cover plate and the mold frame are to be bonded together, so that the cover plate and the mold frame are bonded together by the adhesive at the extended part and the area outside the extended part;
   wherein the touch flexible printed circuit board comprises:
   first binding parts bound to a side, facing away from the display panel, of the touch panel;
   second binding parts bent to the side, facing away from the touch panel, of the display panel; and
   bent parts configured to connect the first binding parts with the second binding parts;
   wherein the through holes are formed in the bent parts; or
   the through holes comprise a plurality of first through holes formed in each first binding part and a plurality of second through holes formed in each second binding part.

2. The touch display device according to claim 1, wherein the first through holes are symmetric to the second through holes.

3. The touch display device according to claim 1, wherein the adhesive further covers an inner side wall of a side, facing the touch display module, of the extended part.

4. The touch display device according to claim 3, wherein the adhesive further covers part of the bottom.

5. The touch display device according to claim 4, wherein an orthographic projection of the adhesive on the bottom is overlapped with the touch flexible printed circuit board.

6. The touch display device according to claim 1, wherein the display panel comprises:
   a first display part opposite to the touch panel;
   a second display part bent to a back of the display panel; and
   a third display part configured to connect the first display part with the second display part;
   wherein the second binding parts are located on a side, facing the bottom, of the second display part.

7. The touch display device according to claim 6, wherein the touch display device further comprises a coating covering the third display part, and a gap is formed between the adhesive and the coating.

8. The touch display device according to claim 7, wherein the touch display module further comprises:
a first back film, located on a side, facing away from the touch panel, of the first display part;
a second back film, located on a side, facing the touch panel, of the second display part;
a heat radiating film, located on a side, facing away from the first display part, of the first back film; and
first glue, located between the heat radiating film and the second back film.

9. The touch display device according to claim 7, wherein the touch display module further comprises:
a chip on film, comprising:
a first flip-chip part,
a second flip-chip part, and
a third flip-chip part configured to connect the first flip-chip part with the second flip-chip part.

10. The touch display device according to claim 9, wherein the first flip-chip part is located between the second binding parts and the second display part, and the second flip-chip part is attached to a face, facing the bottom, of the heat radiating film.

11. The touch display device according to claim 10, wherein the touch display module further comprises:
a polarizer, located on the side, facing away from the display panel, of the touch panel;
second glue, located between the polarizer and the touch panel; and
third glue, located between the polarizer and the cover plate.

12. A method for preparing the touch display device according to claim 1, comprising:
providing the touch display module;
binding the touch flexible printed circuit board to a side edge of the touch display module;
placing the touch display module to which the touch flexible printed circuit board is bound in the groove of a mold frame;
forming adhesive at the end part of the extended part of the mold frame; and
bonding the cover plate and the mold frame oppositely, so that the adhesive covers the end part of the extended part, and overflows to a side, facing the touch display module, of the extended part through the through holes in the touch flexible printed circuit board, thereby sticking the cover plate to the mold frame.

13. The method according to claim 12, wherein said binding the touch flexible printed circuit board to the side edge of the touch display module comprises:
binding a flat touch flexible printed circuit board to the touch panel, wherein parts, in contact with the touch panel, of the touch flexible printed circuit board are used as first binding parts;
forming second binding parts, facing away from the touch panel, of the display panel and bent parts configured to connect the first binding parts with the second binding parts by bending the area, protruding from the display panel, of the flat touch flexible printed circuit board inversely towards the side, facing away from the touch panel, of the display panel; and
forming the plurality of through holes by punching the first binding parts and the second binding parts by punching equipment.

14. The method according to claim 12, wherein said binding the touch flexible printed circuit board to the side edge of the touch display module comprises:
binding a flat touch flexible printed circuit board to the touch panel, wherein the flat touch flexible printed circuit board comprises preset bending areas, the preset bending areas protrude from the display panel, and the plurality of through holes are formed in each preset bending area; and
forming bent parts by bending the preset bending areas inversely towards the side, facing away from the touch panel, of the display panel.

15. Terminal equipment, comprising a touch display device, wherein the touch display device comprises:
a cover plate;
a mold frame, comprising a bottom and an extended part, wherein the extended part is connected with an edge of the bottom and extends to one side of the cover plate, and the bottom and the extended part define a groove;
adhesive, located at an end part of the extended part;
a touch display module, located in the groove, wherein the touch display module comprises a display panel and a touch panel, wherein the touch panel is located at a side, facing the cover plate, of the display panel; and
a touch flexible printed circuit board, bound to a side edge of a face, facing away from the display panel, of the touch panel and bent to a side, facing away from the touch panel, of the display panel, wherein the touch flexible printed circuit board comprises a plurality of through holes at an area other than a binding position and is configured to allow the adhesive to overflow to an area outside the extended part through the through holes when the cover plate and the mold frame are to be bonded together, so that the cover plate and the mold frame are bonded together by the adhesive at the extended part and the area outside the extended part;
wherein the touch flexible printed circuit board comprises:
first binding parts bound to a side, facing away from the display panel, of the touch panel;
second binding parts bent to the side, facing away from the touch panel, of the display panel; and
bent parts configured to connect the first binding parts with the second binding parts;
wherein the through holes are formed in the bent parts; or
the through holes comprise a plurality of first through holes formed in each first binding part and a plurality of second through holes formed in each second binding part.

* * * * *

UNITED STATES PATENT AND TRADEMARK OFFICE
CERTIFICATE OF CORRECTION

| | |
|---|---|
| PATENT NO. | : 11,442,564 B2 |
| APPLICATION NO. | : 17/040864 |
| DATED | : September 13, 2022 |
| INVENTOR(S) | : Bing Ji et al. |

It is certified that error appears in the above-identified patent and that said Letters Patent is hereby corrected as shown below:

On the Title Page

Item (73), should read:
CHENGDU BOE OPTOELECTRONICS TECHNOLOGY CO., LTD. CHENGDU, SICHUANG, CHINA BEIJING BOE TECHNOLOGY DEVELOPMENT CO., LTD. BEIJING, CHINA Signed and Sealed this
Twelfth Day of December, 2023

*Katherine Kelly Vidal*

Katherine Kelly Vidal
*Director of the United States Patent and Trademark Office*